United States Patent
Li

(10) Patent No.: US 11,436,360 B2
(45) Date of Patent: Sep. 6, 2022

(54) SYSTEM AND METHOD FOR STORING ENCRYPTED DATA

(71) Applicant: Huawei Technologies Co., Ltd., Shenzhen (CN)

(72) Inventor: Yong Li, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 152 days.

(21) Appl. No.: 16/882,072

(22) Filed: May 22, 2020

(65) Prior Publication Data

US 2020/0285765 A1   Sep. 10, 2020

Related U.S. Application Data

(63) Continuation of application No. PCT/EP2017/080252, filed on Nov. 23, 2017.

(51) Int. Cl.
| | |
|---|---|
| *G06F 21/62* | (2013.01) |
| *G06F 16/215* | (2019.01) |
| *H04L 9/08* | (2006.01) |
| *H04L 9/40* | (2022.01) |

(52) U.S. Cl.
CPC ........ *G06F 21/6227* (2013.01); *G06F 16/215* (2019.01); *H04L 9/0841* (2013.01); *H04L 63/0428* (2013.01); *H04L 63/061* (2013.01); *G06F 2221/2107* (2013.01)

(58) Field of Classification Search
CPC .................................................. G06F 21/6227
See application file for complete search history.

(56) References Cited

U.S. PATENT DOCUMENTS

| | | | |
|---|---|---|---|
| 6,757,825 B1 * | 6/2004 | MacKenzie | H04L 9/0841 340/5.1 |
| 8,281,143 B1 * | 10/2012 | Clifford | G06F 21/6218 713/179 |
| 8,930,687 B1 | 1/2015 | Robinson et al. | |
| 9,081,771 B1 | 7/2015 | Faibish et al. | |
| 2015/0227543 A1 * | 8/2015 | Venkatesh | G06F 16/119 707/620 |

(Continued)

OTHER PUBLICATIONS

Bellare et al., "Message-Locked Encryption and Secure Deduplication," Advances in Cryptology—EUROCRYPT 2013. pp. 1-29 (2013).

(Continued)

*Primary Examiner* — Simon P Kanaan
(74) *Attorney, Agent, or Firm* — Leydig, Voit & Mayer, Ltd.

(57) ABSTRACT

The present disclosure provides a system for storing encrypted data. The system comprises a server and a plurality of clients. A first client of the plurality of clients is configured to send to the server a first reference value calculated from data to be encrypted and stored. The server is configured to determine a group of second clients from the plurality of clients, the second clients having each sent to the server data with a second reference value equal to the first reference value. The group of second clients is configured to perform a passive key exchange protocol with the first client, and the server is configured to determine, based on a result of the passive key exchange protocol, whether the data is to be stored in full or as deduplicated data.

18 Claims, 6 Drawing Sheets

(56) References Cited

U.S. PATENT DOCUMENTS

2019/0087588 A1* 3/2019 Baboval ............... G06F 21/602

OTHER PUBLICATIONS

Bellare et al., "DupLESS: Server-Aided Encryption for Deduplicated Storage*," USENIX Security Symposium 2013, pp. 1-16 (2013).
Liu et al., "Secure Deduplication of Encrypted Data without Additional Independent Servers," ACM CCS'15, pp. 874-885 (Oct. 2015).

* cited by examiner

SYSTEM AND METHOD FOR STORING ENCRYPTED DATA

CROSS-REFERENCE TO RELATED APPLICATIONS

This application is a continuation of International Application No. PCT/EP2017/080252, filed on Nov. 23, 2017, the disclosure of which is hereby referenced in its entirety.

TECHNICAL FIELD

The present disclosure relates to a system and a method for storing encrypted data. In particular, the system and method are for storing encrypted data on a shared storage, for instance, on a cloud storage. The encrypted data is specifically stored on the shared storage by using deduplication techniques, i.e. as deduplicated encrypted data.

BACKGROUND

On the one hand, users with the intention to store (private) data on a shared storage, usually want to store this data in an encrypted manner. That is because users usually do not want the storage provider to have unlimited access to the stored data.

On the other hand, storage providers typically perform deduplication on the data, which users store on their shared storage. Deduplication has become a common practice to reduce the required storage space, namely by removing data that has already been stored. Instead of storing duplicates, the deduplication techniques typically store some form of references to where duplicate data is already stored. In this way, users can store more data on the same amount of storage space of the shared storage. However, storage providers can typically not perform deduplication on encrypted data.

According to the above, users face a dilemma. Either they use encryption on their private data before uploading the data to the shared storage, thereby gaining the advantage that the data is secure from the storage provider. This means, however, that the users have to store their encrypted data entirely in the shared storage, and accordingly the space required to store the data increases significantly.

Alternatively, users leave their data unencrypted when uploading it to the shared storage, thereby gaining the advantage of full deduplication functionality, which means that much less storage space is required. Obviously, this advantage comes with the disadvantage that the data is not secure from the storage provider.

A desired scenario for users would be to store encrypted data (wherein the encryption key for the data always remains under user control), so that the storage provider has no access to the data, while deduplication is nevertheless performed on the encrypted files, in order to reduce the storage space required.

Some conventional encryption schemes support certain (combinations of) deduplication operations over encrypted data. However, for predictable files these solutions are all not secure against offline brute-force guessing attacks. Also, they are not secure against collusion attacks.

To address these problems, some other conventional schemes proposed server-aided deduplication for encrypted data, which provides security against offline brute-force guessing attacks by introducing an additional trust key server. However, such a third-party trust key server cannot be adopted in all real-world scenarios.

Other conventional approaches proposed secure deduplication of encrypted data without using an additional third-party server. Some approaches proposed client-side encryption for secure deduplication, without revealing the existence of outsourcing data in the shared storage. By exploiting password authenticated key exchange (PAKE) in an oblivious key sharing protocol between the uploading data owner and previously outsourced data owners, only a valid data owner can reconstruct the encryption key (i.e. the password in PAKE) for the outsourced cipher text. However, these approaches are not collusion-resilient, i.e. if any colluders belongs to the protocol session, they can break the deduplication security.

SUMMARY

In view of the above-mentioned problems and disadvantages, the present disclosure aims at improving the conventional shared storage solutions. The present disclosure has thereby the objective to increase the security of data stored in a shared storage, while reducing the storage space required to store the data. In particular, the present disclosure aims at providing a system and method for storing data that is both encrypted and deduplicated. That is, the system and method should allow the user to encrypt the data before uploading it to the shared storage, and also to allow the storage provider to perform deduplication on the encrypted data without knowledge of the plain text. Thereby, security of the shared storage and the deduplication system against offline brute-force guessing attacks and against collusion attacks should be high.

In particular, the present disclosure proposes that a shared storage server performs deduplication on encrypted user data by employing a contributive protocol, randomization, and re-encryption techniques.

A first aspect of the disclosure provides a system for storing encrypted data, the system comprising a server and a plurality of clients, wherein a first client of the plurality of clients is configured to send to the server a first reference value calculated from data to be encrypted and stored, the server is configured to determine a group of second clients from the plurality of clients, the second clients having each sent to the server data with a second reference value equal to the first reference value, the group of second clients is configured to perform a passive key exchange protocol with the first client, and the server is configured to determine, based on a result of the passive key exchange protocol, whether the data is to be stored in full or as deduplicated data.

Accordingly, the server can perform deduplication on the data that is to be stored, although the data is encrypted. In particular, the data is secured by a user-controlled encryption, i.e. it is user confidential. The storage provider does not know the key for decrypting the data. Since the server is nevertheless able to perform data deduplication operations on the encrypted data, the storage space required by the user to store the data is drastically reduced. By employing the passive key exchange protocol, the overall security can be improved. Namely, by means of deduplication security for the user side, and confidentiality for the server side. Additionally, the stored encrypted data is more collusion-resilient and, for predictable files, more secure against offline brute-force guessing attacks than conventional solutions. Moreover, no additional trusted third party is needed.

In an implementation form of the first aspect, each second client is configured to generate a first random number, perform a mathematical operation using the first random number and the result of the passive key exchange protocol, and provide the randomized result to the server, and the server is configured to determine, based on the randomized results of the passive key exchange protocol, whether to store the data in full or as deduplicated data.

By introducing this randomization based on the first random number, a higher level of security against collusion attacks is achieved.

In a further implementation form of the first aspect, the server is configured to generate a response message after it has determined how to store the data, generate a second random number, perform a mathematical operation using the second random number and the response message, and send the randomized response message to the first client, and the first client is configured to, upon receiving the randomized response message, encrypt the data to be stored and send the encrypted data to the server.

By introducing this randomization based on the second random number, a higher level of security against collusion attacks is achieved.

In a further implementation form of the first aspect, the server is configured to store the encrypted data received from the first client as deduplicated data in a database, and to delete the encrypted data, if it has determined based on the result of the passive key exchange protocol that the data is to be stored as deduplicated data.

Thus, the amount of storage space, which is required for storing the encrypted data, is significantly decreased.

In a further implementation form of the first aspect, the server is configured to compute control data based on corresponding encrypted data from at least one of the second clients, compare the encrypted data received from the first client with the computed control data, and store the encrypted data received from the first client only, if the control data and the received encrypted data are identical.

Using this additional comparing process prevents an attacker (malicious uploader) from sending fake encrypted date, which could be used for breaking the deduplication security.

In a further implementation form of the first aspect, the server comprises at least one cloud storage server, which is configured to store the encrypted data in full or as deduplicated data in a cloud storage.

In a further implementation form of the first aspect, a reference value calculated from data is a truncated hash value, preferably a truncated 8 bit hash value.

Such an 8 bit hash value provides a suitable fingerprint of the data to be stored, without disclosing any plain text of the data.

In a further implementation form of the first aspect, the server is configured to maintain a table of reference values, each reference value being calculated from data and stored in association with a data ID of said data and with at least one client ID of at least one client that has sent said data to the server, and the server is configured to search the table of the reference values, in order to determine the second group of clients according to the found client IDs.

The table of reference values enables the server to quickly form the groups of second clients.

In a further implementation form of the first aspect, the group of second clients is configured to run a passive Diffie-Hellman protocol with the first client, in order to perform the passive key exchange protocol.

The Diffie-Hellman protocol provides a particular efficient solution for the passive key exchange protocol employed by the system.

In a further implementation form of the first aspect, if no second client of the plurality of clients has sent to the server data with a second reference value equal to the first reference value, the server is configured to generate a plurality of random client IDs, and to perform the passive key exchange protocol with the first client using the random client IDs.

Thus, an attacker cannot conclude from missing action of the system that no client has yet uploaded data with such a reference value. Accordingly, the attacker cannot exploit any such information for an attack.

In a further implementation form of the first aspect, for registering a new client with the server, the new client is configured to generate an encryption key and store it locally, and is configured to send its client ID to the server, and the server is configured to store the client ID of the new client.

The registration improves the security of the system, because only registered clients can participate as data uploaders or second clients.

In a further implementation form of the first aspect, for downloading stored encrypted data via the server, a client is configured to send a download request to the server, and the server is configured to compute the encrypted data from stored deduplicated data or to obtain the fully stored encrypted data, and to send it to said client.

In this way, a downloading client can efficiently and securely obtain the encrypted data from the server.

A second aspect of the disclosure provides a storage method for encrypted data, the method comprising the steps of sending, by a first client of a plurality of clients, a first reference value calculated from data to be encrypted and stored to a server, determining, by the server, a group of second clients from the plurality of clients, the second clients having each sent to the server data with a second reference value equal to the first reference value, performing, by the group of second clients, a passive key exchange protocol with the first client, determining, by the server, based on a result of the passive key exchange protocol, whether the data is to be stored in full or as deduplicated data.

In an implementation form of the second aspect, each second client is generates a first random number, performs a mathematical operation using the first random number and the result of the passive key exchange protocol, and provides the randomized result to the server, and the server determines, based on the randomized results of the passive key exchange protocol, whether to store the data in full or as deduplicated data.

In a further implementation form of the second aspect, the server generates a response message after it has determined how to store the data, generates a second random number, performs a mathematical operation using the second random number and the response message, and sends the randomized response message to the first client, and the first client, upon receiving the randomized response message, encrypts the data to be stored and sends the encrypted data to the server.

In a further implementation form of the second aspect, the server stores the encrypted data received from the first client as deduplicated data in a database, and deletes the encrypted data, if it has determined based on the result of the passive key exchange protocol that the data is to be stored as deduplicated data.

In a further implementation form of the second aspect, the server computes control data based on corresponding encrypted data from at least one of the second clients, compares the encrypted data received from the first client with the computed control data, and stores the encrypted data received from the first client only, if the control data and the received encrypted data are identical.

In a further implementation form of the second aspect, the server comprises at least one cloud storage server, which stores the encrypted data in full or as deduplicated data in a cloud storage.

In a further implementation form of the first aspect, a reference value calculated from data is a truncated hash value, preferably a truncated 8 bit hash value.

In a further implementation form of the second aspect, the server maintains a table of reference values, each reference value being calculated from data and stored in association with a data ID of said data and with at least one client ID of at least one client that has sent said data to the server, and the server searches the table of the reference values, in order to determine the second group of clients according to the found client IDs.

In a further implementation form of the second aspect, the group of second clients runs a passive Diffie-Hellman protocol with the first client, in order to perform the passive key exchange protocol.

In a further implementation form of the second aspect, if no second client of the plurality of clients has sent to the server data with a second reference value equal to the first reference value, the server generates a plurality of random client IDs, and performs the passive key exchange protocol with the first client using the random client IDs.

In a further implementation form of the second aspect, for registering a new client with the server, the new client generates an encryption key and stores it locally, and sends its client ID to the server, and the server stores the client ID of the new client.

In a further implementation form of the second aspect, for downloading stored encrypted data via the server, a client sends a download request to the server, and the server computes the encrypted data from stored deduplicated data or obtains the fully stored encrypted data, and sends it to said client.

According to a third aspect, a storage method for execution by a server in a system for storing encrypted data is given. The storage method comprises the step of receiving from a first client of a plurality of clients a first reference value calculated from data to be encrypted and stored. A group of second clients is determined (identified) from the plurality of clients, wherein the second clients have each sent to the server data with a second reference value equal to the first reference value. A passive key exchange protocol between the first client and the group of second clients is initiated and it is determined, based on a result of the passive key exchange protocol, whether the data is to be stored in full or as deduplicated data.

According to a fourth aspect, a storage method for execution by a first client in a system for storing encrypted data. The storage method comprises sending to a server a first reference value calculated from data to be encrypted and stored; performing a passive key exchange protocol with a group of second clients, wherein the second clients have each sent to the server data with a second reference value equal to the first reference value. Data to be uploaded to the server is encrypted by the client, and sent to the server.

According to a fifth aspect, a server for use in a system for storing encrypted data is provided. The server is configured to receive, from a first client of a plurality of clients, a first reference value calculated from data to be encrypted and stored; determine a group of second clients from the plurality of clients. The second clients have each sent to the server data with a second reference value equal to the first reference value. The server initiates a passive key exchange protocol between the first client and the group of second clients, and determines, based on a result of the passive key exchange protocol, whether the data is to be stored in full or as deduplicated data.

According to a sixth aspect, a first client for use in a system for storing encrypted data is provided. The first client is configured to send to a server a first reference value calculated from data to be encrypted and stored. The first client performs a passive key exchange protocol with a group of second clients, wherein the second clients have each sent to the server data with a second reference value equal to the first reference value. The first client encrypts data to be uploaded to the server and sends the encrypted data to the server.

Although the first aspect and the implementation forms of the first aspect describe a system for storing encrypted data and the cooperation of the server and clients belonging to said system, it is clear that each one of the clients and the server are separate and independent entities (participants) and features of a specific entity are independent from the features of a different entity belonging to the system.

In other words, the server according to the fifth aspect and the method of the third aspect may include, in its further implementations, the features of the server described in the implementation forms of the first aspect. Similarly, the client according to the sixth aspect and the method of the fourth aspect may include, in its further implementations, the features of the client described in the implementation forms of the first aspect.

Further, even if not explicitly written, the method of the second aspect may implement all the steps and features of the implementation forms of the first aspect.

The method of the second to fourth aspects and their implementation forms achieve all effects and advantages described above for the system of the first aspect and its respective implementation forms.

According to a fourth aspect, a computer program product is given. The computer program product includes a set of instruction that, when executed by a processor perform the method of any one of the second to third aspects above.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present disclosure will be explained in the following description of specific embodiments in relation to the enclosed drawings, in which.

DETAILED DESCRIPTION OF EMBODIMENTS

Figure 1:
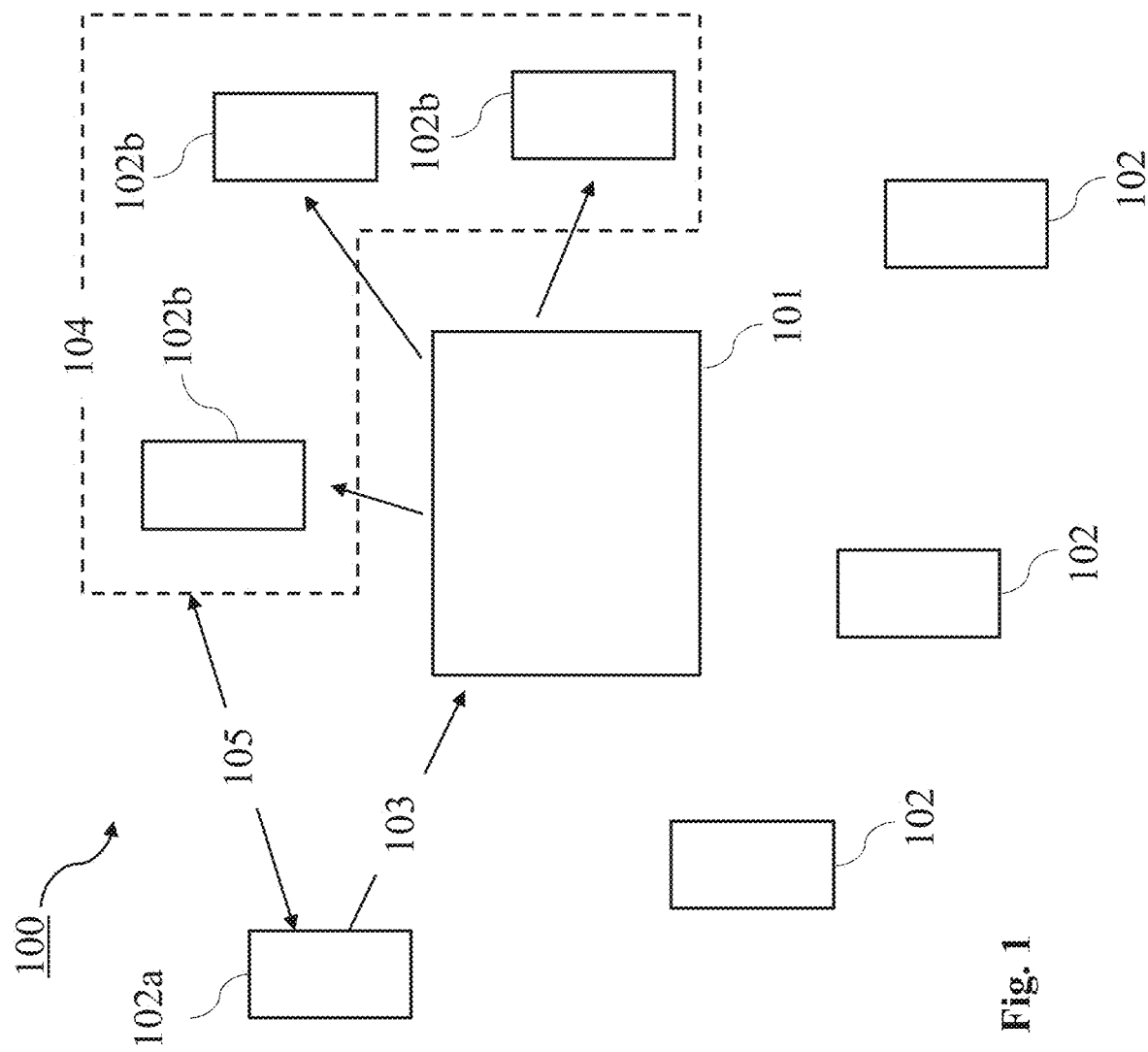
FIG. 1 shows a system according to an embodiment of the present disclosure.

FIG. 1 shows a system 100 according to an embodiment of the present disclosure. The system 100 is suitable for storing encrypted data, in particular for storing data that is both encrypted and deduplicated.

The system 100 comprises a server 101 and a plurality of clients 102. The server 101 may be a server of a shared storage, in particular may be a cloud storage server of a cloud storage. The plurality of clients 102 represent user devices, i.e. for example, they are personal computers, handheld devices, mobile phones, etc. Although the following disclosure in relation to FIGS. 1 to 6 describes the cooperation of the server 101 and clients 102 belonging to a system, it is clear that each one of the clients and the server are separate and independent entities (participants) and features of a specific entity are independent from the features of a different entity belonging to the system 100. In other words, features of the server 101 and of each one of clients 102 can be claimed independently from each other.

A first client 102a of the plurality of clients 102 is configured to send to the server 101 a first reference value 103 calculated from data to be encrypted and stored. In fact, each client 102 is preferably configured to do so.

The server 101 is then configured to determine a group 104 of second clients 102b from the plurality of clients 102, wherein the second clients 102b have each sent to the server 101 data with a second reference value equal to the first reference value 103. In principle, any one of the plurality of clients 102 can be determined by the server 101 to belong to the group 104. The group 104 of second clients 102b is configured to perform a passive key exchange protocol 105 with the first client 102a, preferably a passive Diffie-Hellman protocol.

It is noted that the first client 102a and the second clients 102b are all clients 102 (the reference signs 102a and 102b are used for better understanding). Each client 102 can in principle be first client 102a (when uploading data to the server 101) or second client 102b (when determined as such by the server 101 for an upload process of another client 102a).

The server 101 is then configured to determine, based on a result of the passive key exchange protocol 105, whether the data is to be stored in full or as deduplicated data on the shared storage related to the server 101. Depending on the outcome of this determination, the server 101 can store the data on the shared storage, either the full encrypted (but not deduplicated) data, or as both encrypted and deduplicated data.

The system 100 accordingly includes several main participants. The system 100 includes the plurality of clients 102, specifically a set of clients {Cs}, which can store/download data on the shared storage (to the server 101).

These clients 102 include—considering a certain upload or download process—the first client 102a, also referred to as "Uploader" or "Downloader", which can upload/download data to/from the storage server 101. Further, these clients 102 include—for said certain upload or download process—the determined second clients 102b, each also referred to as a "Checker". Specifically, in order to determine, if any deduplication for some specific data to be stored has already happened, the first client 102a and the second clients 102b (i.e. a subset of clients {Ci} of the set of clients {Cs}) engage in the passive key exchange protocol. The subset {Ci} plays the role of the "Checkers". Further, the system 100 also includes the server 101, which is preferably a cloud storage server.

It is preferably assumed that the server 101 is a semi-honest server, and that the parties communicate through secure channels (e.g., TLS), so that an adversary (A) cannot eavesdrop and/or tamper with any channel. However, an adversary A might compromise any subset of clients 102 or any collusion of these parties.

Figure 2:
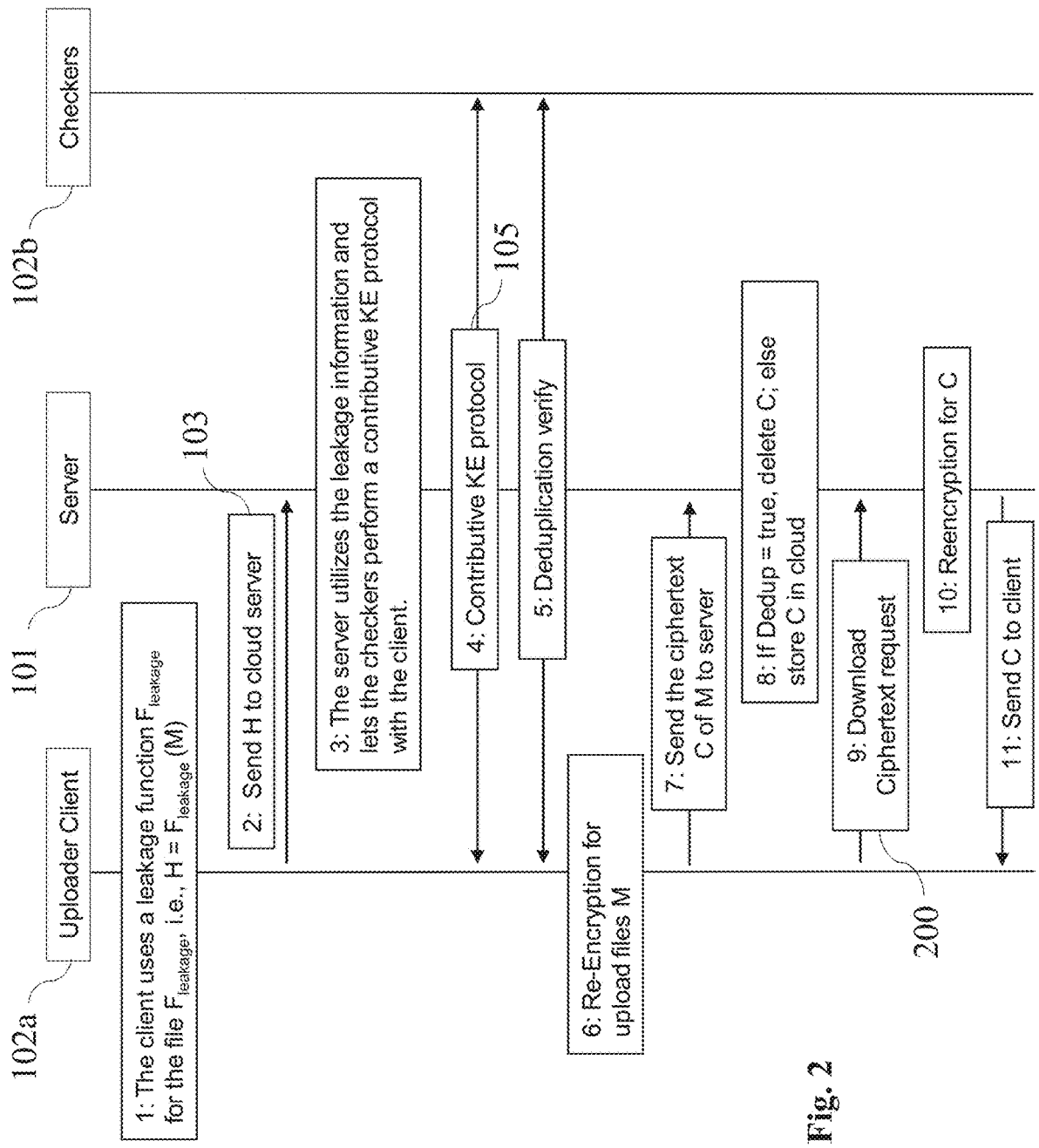
FIG. 2 shows a general interaction in a system according to an embodiment of the present disclosure.

FIG. 2 shows a general interaction in a system 100 according to an embodiment of the present disclosure, which includes the first client 102a (here an "Uploader Client"), the server 101, and the group 104 of second clients 102b (acting as the "Checkers" or Checker clients).

First (1. and 2.), the first client 102a sends to the server 101 a first reference value 103 calculated from data to be encrypted and to be stored via the server (i.e. to be stored on a shared storage related to the server 101). Here, the reference value 103 is exemplarily a leakage function $F_{leakage}$ for the data M, wherein $H=F_{leakage}(M)$.

The server 101 then utilizes (3.) the first reference value 103, and lets the second clients 102b perform (4.) a passive contributive key exchange protocol 105 with the first client 102a. Thereby, the server 101 is able to determine a group 104 of second clients 102b from the plurality of clients 102, wherein all second clients 102b have sent to the server 101 data with a second reference value equal to the first reference value 103. Based on the outcome of the protocol, deduplication can be verified (5.), i.e. the server 101 is able to determine, based on a result of the passive key exchange protocol 105, whether the data M is to be stored in full or as deduplicated data.

The first client 102a can then re-encrypt (6.) the data M that is to be uploaded to the server 101, and can then send (7.) the encrypted data 103 (i.e. cipher text C of M) to the server 101. The server 101 then deletes (8.) the cipher text C, if it was determined that the data M is to be stored as deduplicated data. Otherwise, the server 101 stores directly the cipher text C in the shared storage.

In case that the first client 102a wants at some point to download again the data M from the shared storage, it sends (9.) a download request 200 to the server 101. The server 101 then either computes the cipher text C from the correspondingly stored deduplicated data, or obtains the completely stored cipher text C. Subsequently, the server 101 sends (11.) the cipher text C to the first client 102a.

Figure 3:
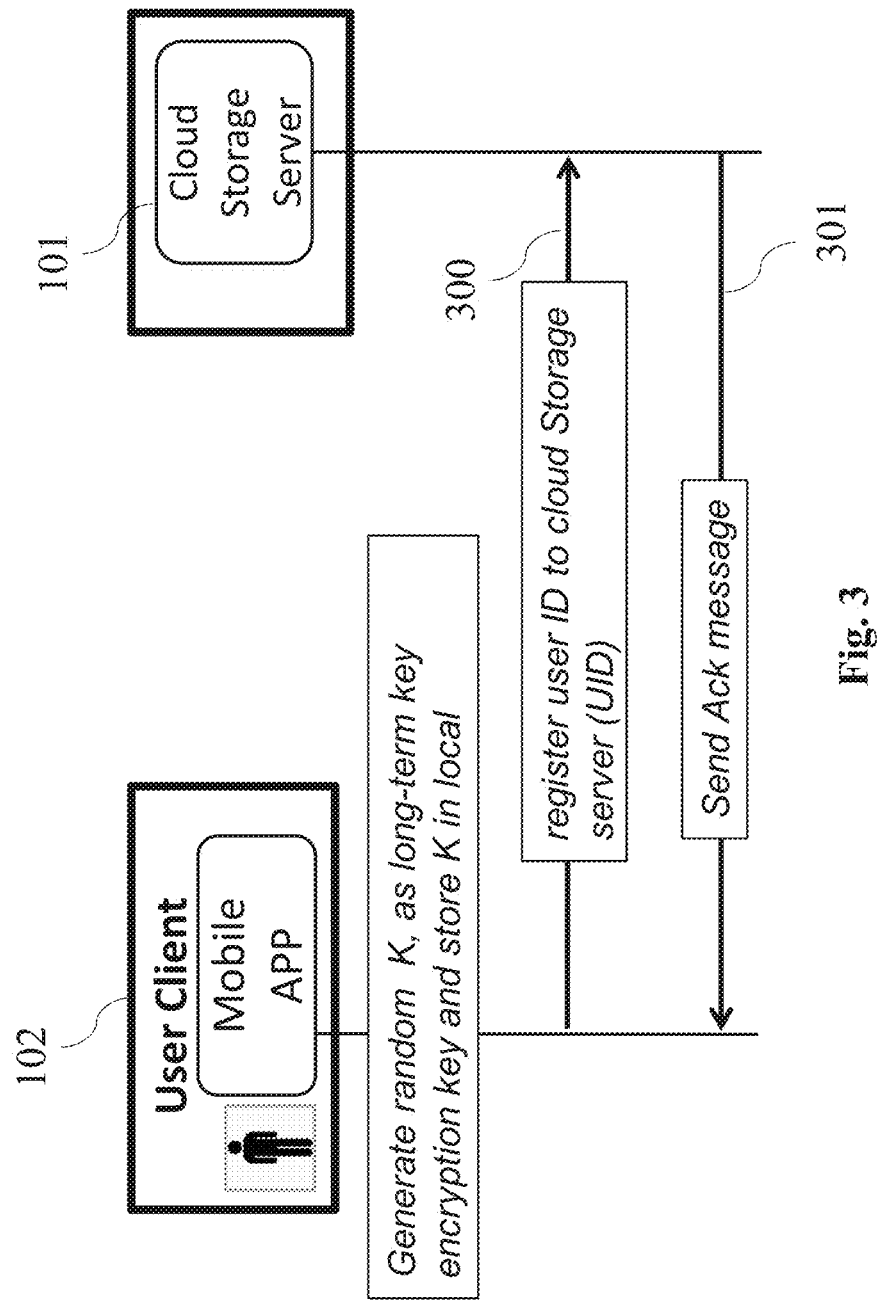
FIG. 3 shows a registration process of a client with a server in a system according to an embodiment of the present disclosure.

FIG. 3 shows a registration phase of a client 102 (here exemplarily via a mobile app) with the server 101 (here exemplarily a cloud storage server). First, the client 102 generates a random key K as a long-term key encryption key, and stores this key K locally. Then, the client 102 registers its user identity (UID) at the server 101. The server 101 stores the UID of the client 102, and sends an Acknowledgment (ACK) message to the client 102. Only registered clients 102 can preferably participate in the upload and download processes for predictable files, which are shown in the FIGS. 4 and 5 and described below.

Figure 4:
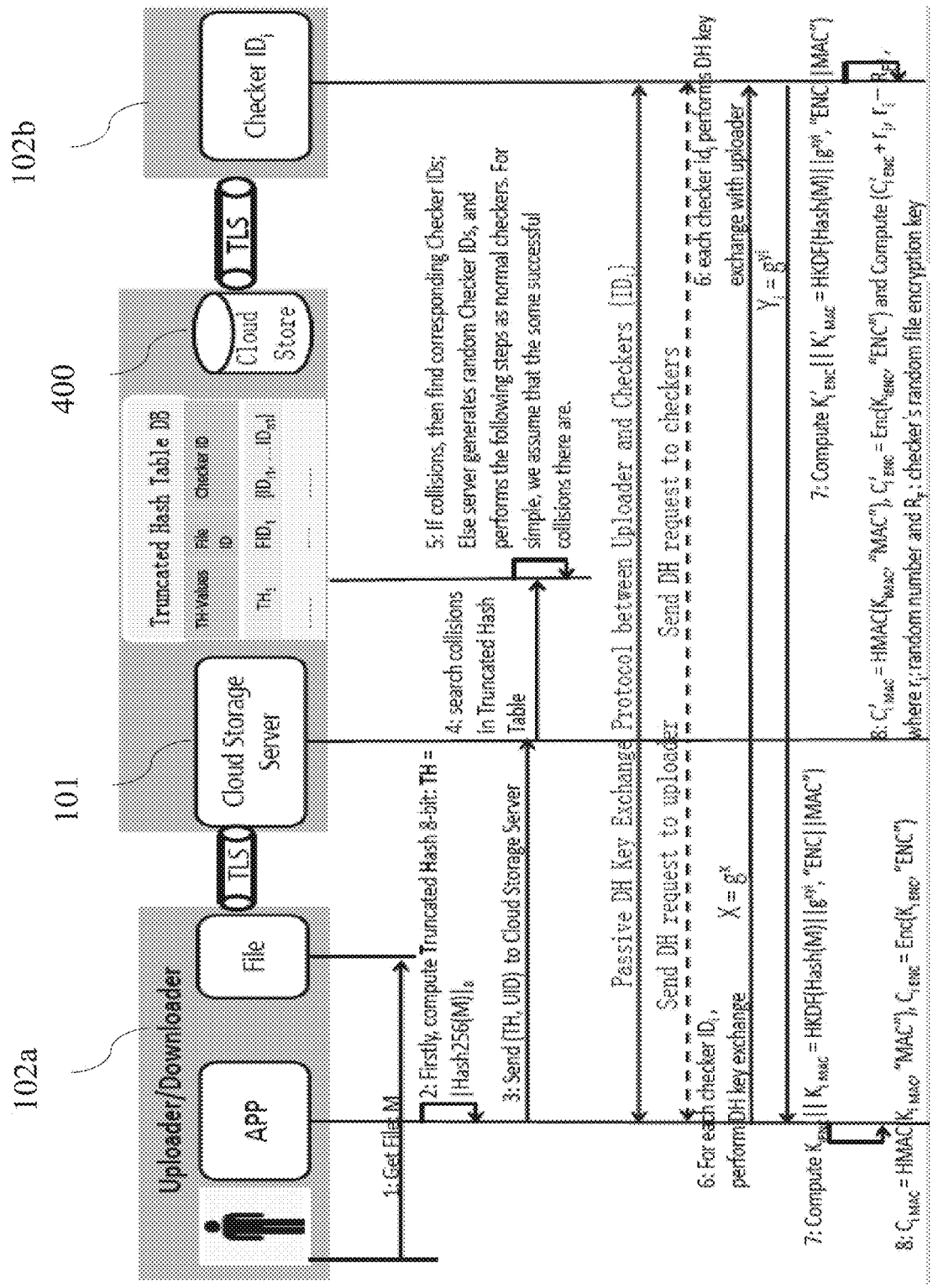
FIG. 4 shows a specific interaction in a system according to an embodiment of the present disclosure, particularly a data upload process.

FIG. 4 shows a specific interaction in a system 100 according to an embodiment of the disclosure. In particular, FIG. 4 shows an upload process for a predictable file.

In a first step (1.), the first client 102a (here acting as an "Uploader") gets a data file M, which is to be stored in the shared storage (here a cloud store 400), from its file system. Then, the first client 102a attempts to upload the data file M to the server 101. To this end, it firstly computes (2.) a reference value 103 from the data M, preferably calculates a truncated Hash value with 8-bits, i.e. $TH=|SHA256(m)|_8$. Then, the client 102a sends (3.) the calculated TH and its UID to the server 101.

The server 101 then checks, whether other clients 102 have already sent to the server 101 data with the same calculated reference value. To this end, the server 101 is preferably configured to maintain a table of reference values. This table may be referred to as "truncated Hash table", if truncated Hash values are used as reference values, and may be as shown below.

| TH values | File ID | "Checker" ID |
|---|---|---|
| $TH_1$ | $FID_1$ | $ID_{i1} \ldots ID_{n1}$ |
| $TH_2$ | $FID_2$ | $ID_{i2} \ldots ID_{n2}$ |
| ... | ... | ... |

Each reference value is calculated from data and stored in association with a data identification FID of said data, and with at least one identification of at least one client 102 that has sent the data to the server 101, i.e. an identification ID of a second client 102b for this data. The server 101 then searches (4.) the (truncated Hash) table for collisions.

Afterwards (5.), if collisions exist, the server 101 finds corresponding IDs, and determines the clients 102 related to the found IDs as the group 104 of second clients 102b (the "Checkers"). Because the 8-bit hash value will lead to a great probability of collision, it is assumed for simplicity that at least some successful collisions exist. For example, the server 101 finds the clients 102b $\{ID_i\}$, which uploaded files $\{FID_i\}$ whose short hash $TH_i$ is equal to TH calculated as first reference value 103 for the data to be stored. If no collisions exist, the server 101 generates one or more random IDs, and personally performs the following steps as a "Checker".

Then (6.), the server 101 lets the group 104 of clients 102b $\{ID_i\}$ run a passive key exchange protocol 105, preferably a passive Diffie-Hellman protocol, with the first client 102a. After running the Diffie-Hellman protocol, each second client 102b gets a session key $k_i=g^{xyi}$ and the first client 102a gets a set of session keys $\{k_i\}$ corresponding to the different $ID_i$ of the second clients 102b.

Further (7.), each second client 102b computes $K'_{i\,ENC}\|K'_{i\,MAC}$=HKDF(Hash(M)$\|g^{xyi}$, "ENC$\|$MAC") using $k_i$. At the same time, the first client 102a also performs the same operation as the second clients 102b, i.e. $K_{i\,ENC}\|K_{i\,MAC}$=HKDF(Hash(M)$\|g^{xyi}$, "ENC$\|$MAC") and gets a set of $\{K_{i\,ENC}\|K_{i\,MAC}\}$.

Then (8.), each second client 102b uses ($K_{i\,MAC}$, $K_{i\,ENC}$) to compute $C_{iMAC}$=HMAC($K_{iMAC}$, "MAC"), $C_{i\,ENC}$=Enc($K_{i\,ENC}$, "ENC"). Moreover, each second client 102b generates a random number $r_i$ and computes ($C_{i\,ENC}+r_i$, $r_i-R_F$), wherein RF is a random file M encryption key of the second client 102b.

Then (9.), the first client 102a sends $\{C_{i\,MAC}\}$ to the server 101. At the same time, each second client 102b sends ($C_{i'MAC}$, $C_{i'ENC}+r_i$, $r_i-R_F$) to the server 101.

After (10.) receiving these messages from all second clients 102b of the group 104, the server 101 compares Ci MAC with the set of $\{C_{i\,MAC}\}$. If $C_{i\,MAC}=C_{i'MAC}$, then the server concludes that "Dedup=Yes", i.e. that deduplication should be applied, computes T=($C_{i\,ENC}+r_i$)+t, and stores ($r_i-R_F$) in the shared storage 400. Else, the server concludes that "Dedup=No", i.e. that deduplication should not be applied. In this case, T=t, wherein t is a random number generated by the server 101.

Then (11.), the server 101 sends T to the client 102a.

Furthermore (12.), the first client 102a generates a random number n, computes R=(T−$C_{i\,ENC}$+n), and $C_R$=Enc(K, R) using the long-term K. Then, it computes the cipher text C of M as C=M $g^R$. Finally, it stores $C_R$ as file-key-index locally.

The first client 102a then (13.) sends (C, n) to the server 101.

Then (14.), if Dedup=No, the server 101 stores the cipher text C in the shared storage 400 with UID. In other words, the server 101 is further configured to directly store the encrypted data received from the first client 102a, if it has determined that the data is to be stored in full.

Else, the server 101 computes L=(($r_i-R_F$)+n+t) and FID=Hash(T$\|$C), and stores $\{FID, L\}$. In other words, the server 101 is further configured to store the encrypted data C received from the first client 102a as deduplicated data in a database, if it has determined that the data is to be stored as deduplicated data.

However, preferably the server 101 further selects the cipher text $C_i$ of a second client 102b, and computes C'=$C_i$ $g^L$. Finally, it additionally compares C' and C. If the comparison yields C'=C, the server 101 deletes the cipher text C generated by the client 102a. In other words, the server 101 is configured to compute control data C' based on corresponding encrypted data from at least one of the second clients 102b, compare the encrypted data C received from the first client 102a with the computed control data C', and store the encrypted data C received from the first client 102a as deduplicated data, if the control data C' and the received encrypted data C are identical. Else, it stores C in full.

Finally (15.), the server 101 sends FID to the first client 102a.

Figure 5:
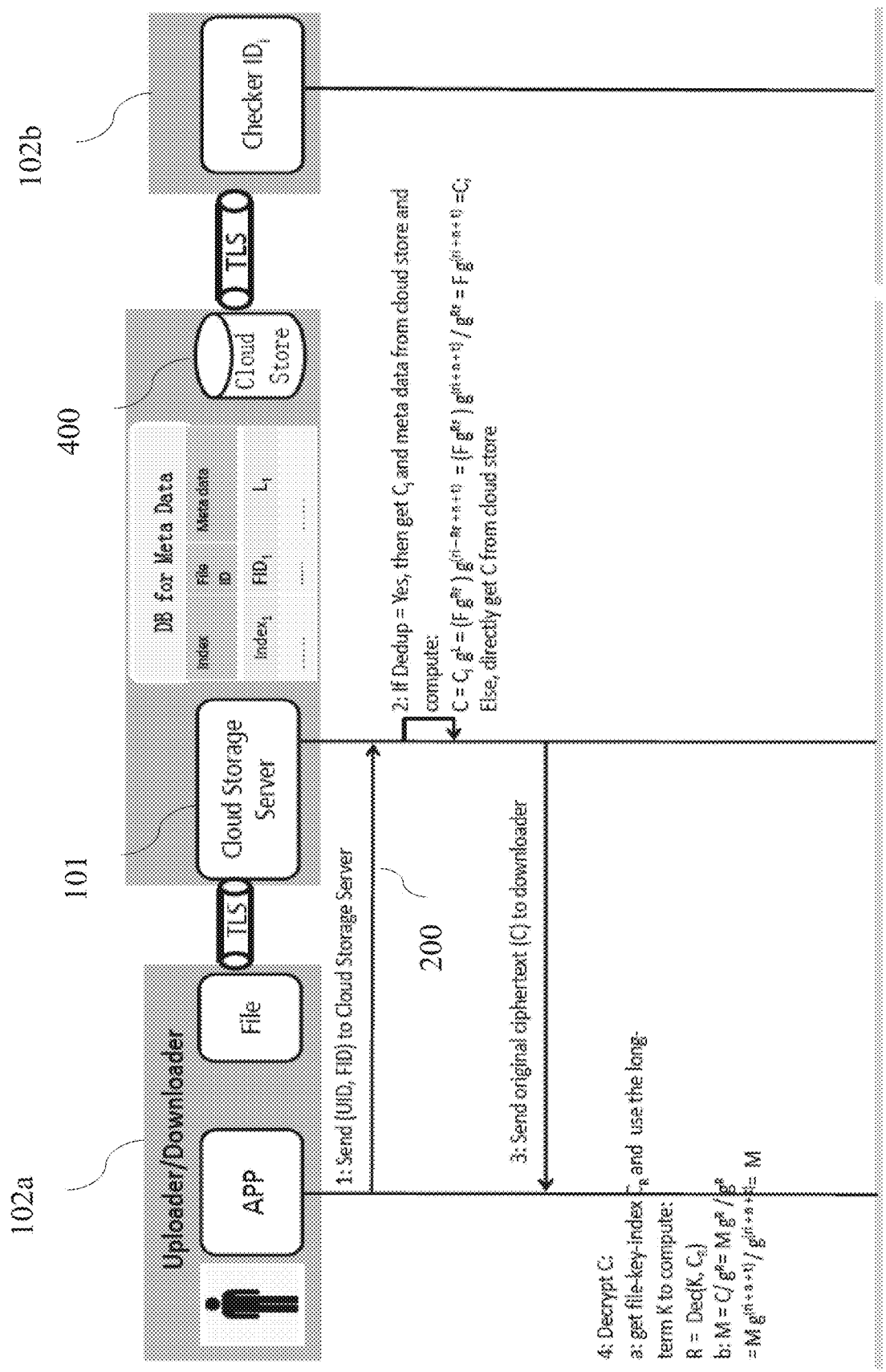
FIG. 5 shows a specific interaction in a system according to an embodiment of the present disclosure, particularly a data download process.

FIG. 5 shows another interaction in a system 100 according to an embodiment of the disclosure. In particular, FIG. 5 shows a download process for a predictable file.

First (1.), the first client 102a, which has previously uploaded encrypted data 103 to the server 101, sends (UID, FID) to the server 101. Then (2.), if Dedup=Yes, the server 101 gets $C_i$ and metadata from the shared storage 400, and computes the original cipher text C, i.e. the originally uploaded encrypted date 103, namely as follows:

$$C=C_i\,g^L=(F\,g^{RF})g^{(ri-RF+n+t)}=(F\,g^{RF})g^{(ri+n+t)}/g^{RF}=F\,g^{(ri+n+t)}=C;$$

Else, the server 101 directly gets C from the shared storage 400.

Then (3.), the server 101 sends the original cipher text C to the client 102a. The client 102a then (4.) performs the decryption of C as follows: First, it gets the file-key-index $C_R$, and uses the long-term K to compute R=Dec(K, $C_R$). Then, it computes the original data M by applying $$M=C/g^R=M\,g^R/g^R=M\,g^{(ri+n+t)}/g^{(ri+n+t)}=M$$

Figure 6:
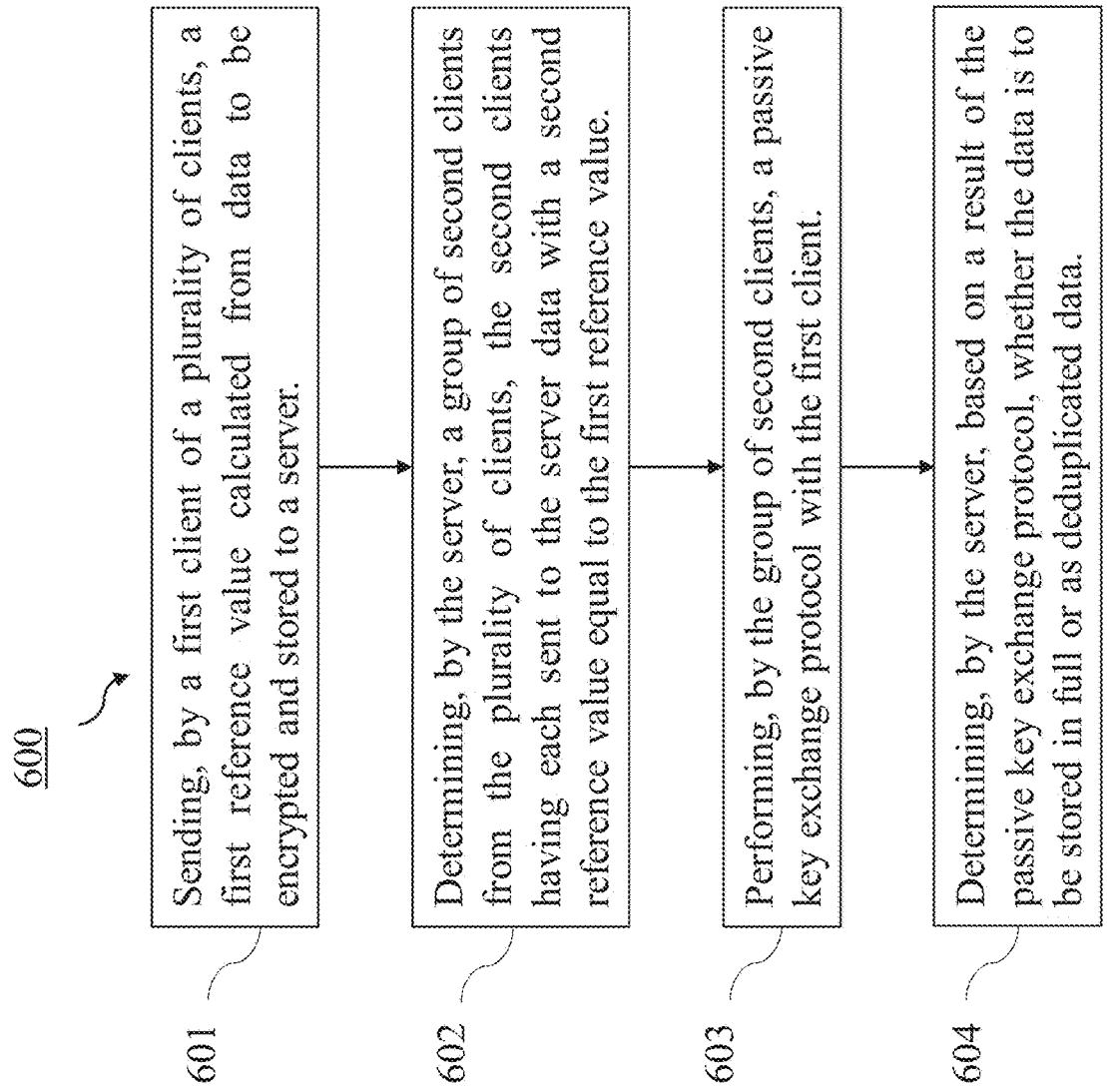
FIG. 6 shows a method according to an embodiment of the present disclosure.

FIG. 6 shows a method 600 according to an embodiment of the present disclosure. The method 600 is particularly a storage method for encrypted data, and comprises the steps of: Sending 601, by a first client 102a of a plurality of clients 102, a first reference value 103 calculated from data to be encrypted and stored to a server 101. Determining 602, by the server 101, a group 104 of second clients 102b from the plurality of clients 102, the second clients 102 having each sent to the server 101 data with a second reference value equal to the first reference value 103. Performing 603, by the group 104 of second clients 102, a passive key exchange protocol 105 with the first client 102a. Determining 604, by the server 101, based on a result of the passive key exchange protocol 105, whether the data is to be stored in full or as deduplicated data.

The present invention has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A server for storing encrypted data, the server comprising:
   a processor; and
   a non-transitory computer readable medium storing instructions, that when executed by the processor cause the server to perform steps comprising:
      receiving, from a first client of a plurality of clients, a first reference value calculated from data to be encrypted and stored, wherein the first reference value is a truncated hash of the data;
      determining a group of second clients from the plurality of clients, the group of second clients having each sent to the server data with a second reference value equal to the first reference value, wherein each second reference value is a truncated hash of the data sent to the server and the first reference value and each second reference value are calculated based on key exchange protocol between each second client and the first client, and
      determining, based on the first reference value and each second reference value, whether the data is to be stored in full or as deduplicated data.

2. The server according to claim 1, the steps further comprising:
   determining, based on randomized results of the key exchange protocol, whether to store the data in full or as deduplicated data,
   wherein
      each second client is configured to generate a first random number, perform a mathematical operation using the first random number and the result of the key exchange protocol, and provide the randomized result to the server.

3. The server according to claim 1, the steps further comprising:
   generating a response message after it is determined how to store the data;
   generating a second random number;
   performing a mathematical operation using the second random number and the response message;
   sending the randomized response message to the first client; and
   receiving encrypted data from the first client, wherein the first client is configured to, upon receiving the randomized response message, encrypt the data.

4. The server according to claim 1, the steps further comprising:
   storing the encrypted data received from the first client as deduplicated data in a database; and
   deleting the encrypted data, in response to determining, based on the result of the key exchange protocol that the data is to be stored as deduplicated data.

5. The server according to claim 4, wherein, before storing the received encrypted data as deduplicated data, the steps further comprise:
   computing control data based on corresponding encrypted data from at least one of the second clients;
   comparing the encrypted data received from the first client with the computed control data; and
   storing the encrypted data received from the first client when the server determines the control data and the received encrypted data are identical.

6. The server according to claim 1, wherein
   the server further comprises at least one cloud storage server, which is configured to store the encrypted data in full or as deduplicated data in a cloud storage.

7. The server according to claim 1, wherein
   a reference value calculated from data is a truncated 8 bit hash value.

8. The server according to claim 1, the steps further comprising:
   maintaining a table of reference values, each reference value being calculated from data and stored in association with a data ID of said data and with at least one client ID of at least one client that has sent said data to the server and
   searching the table of the reference values, in order to determine the second group of clients according to the found client IDs.

9. The server according to claim 1, wherein
   the group of second clients is configured to run a Diffie-Hellman protocol with the first client, in order to perform the key exchange protocol.

10. The server according to claim 1, the steps further comprising:
    when the server has not received
    data with a second reference value equal to the first reference value from one of the second clients of the plurality of clients,
    generating a plurality of random client IDs, and performing the key exchange protocol with the first client using the random client IDs.

11. The server according to claim 1, the steps further comprising:
    storing a client ID of a new client,
    wherein,
    the new client is configured to generate an encryption key and store it locally, and is configured to send its client ID to the server.

12. The server according to claim 1, the steps further comprising:
    receiving a download request from a client; and
    computing the encrypted data from stored deduplicated data or to obtaining the fully stored encrypted data, and to sending the data to the client.

13. A server for use in a system for storing encrypted data, the server comprising a processor and a non-transitory memory storing instructions that when executed by the processor cause the server to:
  receive, from a first client of a plurality of clients, a first reference value calculated from data to be encrypted and stored, wherein the first reference value is a truncated hash of the data,
  determine a group of second clients from the plurality of clients, the group of second clients having each sent to the server data with a second reference value equal to the first reference value, wherein each second reference value is a truncated hash of the data sent to the server and the first reference value and each second reference value are calculated based on a key exchange protocol between the first client and the group of second clients, and
  determine, based on the first reference value and each second reference value, whether the data is to be stored in full or as deduplicated data.

14. A first client for use in a system for storing encrypted data, the first client comprising a processor and a non-transitory memory storing instructions that when executed by the processor cause the client to:
  send to a server a first reference value calculated from data to be encrypted and stored, wherein the first reference value is a truncated hash of the data
  perform a passive key exchange protocol with a group of second clients, the group of second clients having each sent to the server data with a second reference value equal to the first reference value, wherein each second reference value is a truncated hash of the data sent to the server and the first reference value and each second reference value are calculated based on a key exchange protocol between each second client and the first client; and
  encrypt data to be uploaded to the server, and send the encrypted data to the server.

15. A storage method for encrypted data, the method comprising the steps of:
  sending, by a first client of a plurality of clients, a first reference value calculated from data to be encrypted and stored to a server, wherein the first reference value is a truncated hash of the data,
  determining, by the server, a group of second clients from the plurality of clients, the group of second clients having each sent to the server data with a second reference value equal to the first reference value, wherein each second reference value is a truncated hash of the data sent to the server and the first reference value and each second reference value are calculated based on a key exchange protocol between each second client and the first client; and
  determining, by the server, based on a result of the passive key exchange protocol, whether the data is to be stored in full or as deduplicated data.

16. A storage method for execution by a server in a system for storing encrypted data, the storage method comprising the steps of:
  receiving from a first client of a plurality of clients a first reference value calculated from data to be encrypted and stored, wherein the first reference value is a truncated hash of the data,
  determining a group of second clients from the plurality of clients, the group of second clients having each sent to the server data with a second reference value equal to the first reference value, each second reference value is a truncated hash of the data sent to the server and the first reference value and each second reference value are calculated based on a key exchange protocol between the first client and each second client, and
  determining, based on the first reference value and each second reference value, whether the data is to be stored in full or as deduplicated data.

17. A storage method for execution by a first client in a system for storing encrypted data, the storage method comprising the steps of:
  sending to a server a first reference value calculated from data to be encrypted and stored, wherein the first reference value is a truncated hash of the data,
  performing a passive key exchange protocol with a group of second clients, the second clients having each sent to the server data with a second reference value equal to the first reference value, wherein each second reference value is a truncated hash of the data sent to the server and the first reference value and each second reference value are calculated based on a key exchange protocol between each second client and the first client;
  encrypting data to be uploaded to the server, and
  sending the encrypted data to the server.

18. A non-transitory computer readable memory storing a set of instructions that, when executed by a processor perform a method comprising:
  receiving from a first client of a plurality of clients a first reference value calculated from data to be encrypted and stored, wherein the first reference value is a truncated hash of the data,
  determining a group of second clients from the plurality of clients, the group of second clients having each sent to the server data with a second reference value equal to the first reference value, each second reference value is a truncated hash of the data sent to the server and the first reference value and each second reference value are calculated based on
  a key exchange protocol between the first client and the each second client, and
  determining, based on the first reference value and each second reference value, whether the data is to be stored in full or as deduplicated data.

* * * * *